W. ATWOOD.
APPARATUS FOR OXIDIZING METALS.
No. 46,618. Patented Mar. 7, 1865.
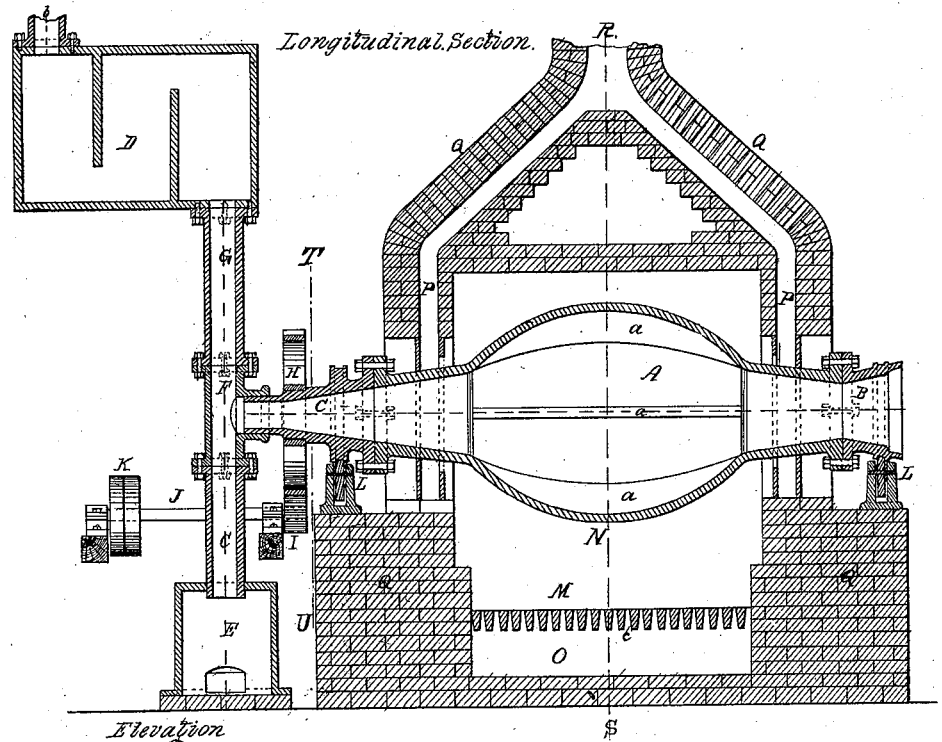
Longitudinal Section.
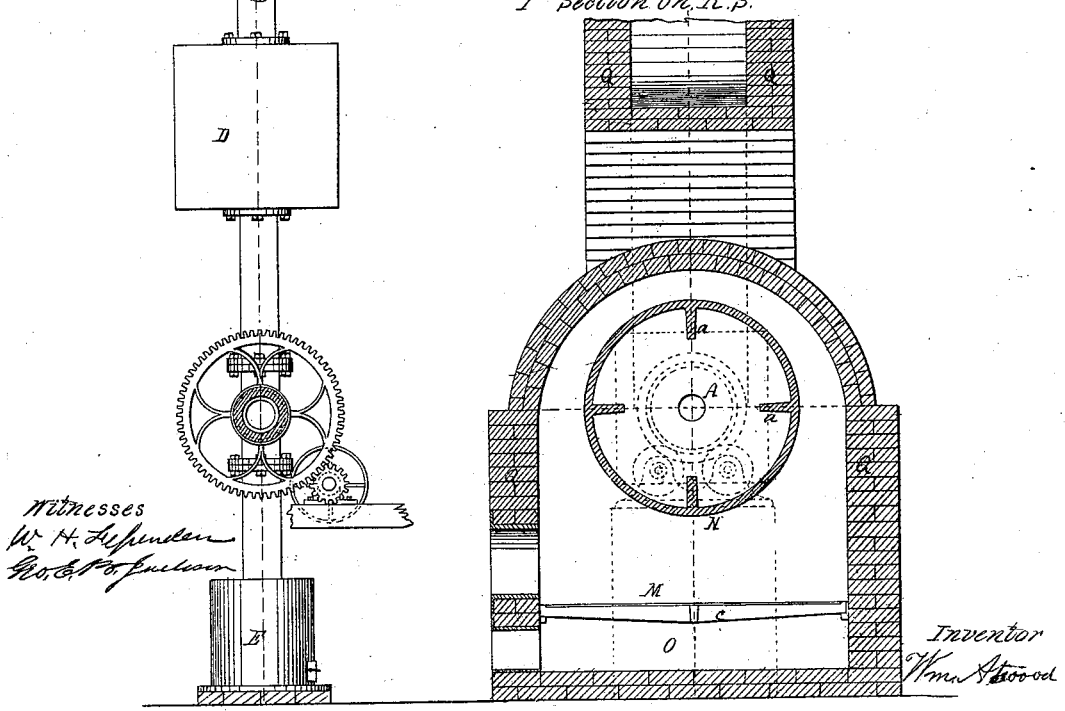
Elevation.
T Section on R.S.
Witnesses
Inventor
Wm. Atwood

UNITED STATES PATENT OFFICE.

WM. ATWOOD, OF CAPE ELIZABETH, MAINE.

IMPROVED APPARATUS FOR OXIDIZING METALS.

Specification forming part of Letters Patent No. 46,618, dated March 7, 1865.

*To all whom it may concern:*

Be it known that I, WILLIAM ATWOOD, of Cape Elizabeth, in the county of Cumberland and State of Maine, have invented a new and useful apparatus for the oxidation of metals or other substances, consisting of a revolving chamber, heated to a regulated temperature, through which a current of air is passed, and into which the material to be oxidized is introduced; and I do hereby declare that the following is a full, clear, and exact description of the construction and operation of the same, reference being had to the annexed drawing, making a part of this specification.

The apparatus so invented consists of the revolving chamber A, made of cast-iron, fire-clay, or other suitable material, of any convenient form, that delineated on the drawing being preferred, open at the orifice B, and communicating through the passage C with the chambers D and E by means of the duct F G G. Motion is communicated to the revolving chamber A by the pulley K, the counter-shaft J, the pinion I, and the gear-wheel H, or by any suitable gearing. The revolving chamber A rests upon the bearings L L, is set in the brick-work Q Q, and is heated by means of the fire-box M and the heated-air chamber N, communicating with the chimney R by means of the flues P P.

*a a* represent flanges in the interior of the revolving chamber A.

The material to be oxidized is introduced into the revolving chamber A through the orifice B, and is there subjected to the combined action of heat communicated from the heated-air chamber N and the oxygen of a current of atmospheric air admitted at the orifice B, passing through the chamber A, and thence through the passage C into the duct F G, whence it passes through the chamber D into a chimney or other proper mode for obtaining a draft into the open air. Such particles of the material to be oxidized as may be carried by the draft into the passage F G are collected in the chambers D and E.

The object of the flanges *a a* is to keep fresh surfaces of the material to be oxidized constantly exposed to the current of air passing through the revolving chamber A. These flanges may be one or more in number, or may be entirely omitted, according to the material proposed to be oxidized.

I claim—

The invention of a revolving chamber so constructed as to admit the passage of a constant current of atmospheric air over and through the material to be oxidized while the same is kept in constant motion and exposed to any desirable degree of heat.

WM. ATWOOD.

Witnesses:
M. M. BUTLER,
GEO. E. B. JACKSON.